United States Patent [19]

Hori et al.

[11] Patent Number: 5,184,646
[45] Date of Patent: Feb. 9, 1993

[54] PILOT VALVE

[75] Inventors: Shuji Hori; Tadao Karakama; Jun Maruyama, all of Kawasaki, Japan

[73] Assignee: Kabushiki Kaisha Komatsu Seisakusho, Tokyo, Japan

[21] Appl. No.: 628,401
[22] PCT Filed: Apr. 25, 1990
[86] PCT No.: PCT/JP90/00541
§ 371 Date: Dec. 17, 1990
§ 102(e) Date: Dec. 17, 1990
[87] PCT Pub. No.: WO90/13766
PCT Pub. Date: Nov. 15, 1990
[51] Int. Cl.[5] .............................. F15B 13/06
[52] U.S. Cl. ......................... 137/636.2; 74/471 XY
[58] Field of Search ............... 74/471 XY; 137/636.2

[56] References Cited

U.S. PATENT DOCUMENTS 2,958,233 11/1960 Johnson .................... 74/471 XY
4,285,250 8/1981 Iizuka et al. ............. 137/636.2 X
4,777,981 10/1988 Petro ........................ 137/636.2

FOREIGN PATENT DOCUMENTS 50-37924 4/1975 Japan.
60-122071 8/1985 Japan.

Primary Examiner—Gerald A. Michalsky
Attorney, Agent, or Firm—Frost & Jacobs

[57] ABSTRACT

The object of the inventioin is to provide a pilot valve which is compact, prevents erroneous operation, and is inexpensive to manufacture. The pilot valve includes a valve body (1), inlet port (2) and outlet ports (3) formed in the valve body, spools (4) operable to interrupt/establish communication between the inlet port (2) and the outlet port (3), pistons (8) for slidably moving the spools (4), a lever (15), and a disk (14) adapted to transmit movement of the lever (15) and having a downwardly directed spherical recess (23). The valve body has a spherical projection (20) pivotably received in the spherical recess (23). A lever mounting shaft (13) is prevented from rotating about its own axis during operation of the lever.

5 Claims, 6 Drawing Sheets

THE PRIOR ART

PILOT VALVE

TECHNICAL FIELD OF THE INVENTION

The present invention relates to a pilot valve operable to supply oil under pressure to a hydraulic circuit provided downstream of the pilot valve by pivoting a lever in forward, backward, leftward and rightward directions.

BACKGROUND OF THE INVENTION

As shown in FIG. 1, a known pilot valve includes a valve body 1 within which four spools 4 are slidably disposed to establish and interrupt communication between an inlet port 2 and an outlet port 3. Cylindrical guides 5 are fit in the valve body 1 in a coaxial relation to the spools 4. Retainers 6 are pressed toward the lower surface of the cylindrical guides 5 by primary springs 7. This causes pistons 8 to slidably move up within the cylindrical guides 5. Springs 9 are used to hold the spools 4 in a piston to interrupt communication between the inlet port 2 and the outlet port 3. A plate 10 is placed on the valve body 1 and has an opening 11. A universal joint 12 has a base portion 12a which extends through the opening 11 for threaded engagement with the upper portion of the valve body 1. A top portion 12b of the universal joint 12 has a mounting shaft 13 and a disk 14. A lever 15 is mounted to the mounting shaft 13. When the lever 15 is pivotally moved in forward, rearward, leftward and rightward directions, the disk presses down either one of the two pistons or both pistons 5. This causes the spools 4 to move in a direction to establish communication between the inlet and outlet ports. Oil under pressure then flows from the inlet port 2 to the outlet port 3 through oil holes 4a of the spools 4.

With such a pilot valve, the universal joint 12 is used to pivot the lever 15 in forward, rearward, leftward and rightward directions relative to the valve body 1. The universal joint 12 per se is complicated in structure, requires a number of parts, and is expensive. The overall size of the pilot valve can not be reduced since the universal joint is quite large.

In addition, when the lever 15 is operated, the retainers 6 come into contact with steps 16 of the valve body 1 to limit stroke of the lever 15. The pistons 8 and the retainers 6 thus function as a stopper and are subject to heavy loads. In order to improve durability, the retainers 6 and the pistons 8 must be made lager and made of expensive and high quality materials. This results in an increase in the size and cost of the overall pilot valve.

SUMMARY OF THE INVENTION

In view of the foregoing, it is a primary object of the present invention to provide a pilot valve which can be manufactured at a reduced cost, is compact, and prevents erroneous operation by reducing the number of parts of and simplifying the structure of a mount by which a disk is mounted to transmit pivotal movement of a lever in forward, rearward, leftward and rightward directions to each piston.

Another object of the present invention is to provide a pilot valve which prevents application of heavy loads to each piston and retainers for supporting the pistons, and which reduces the size of these components and thus, the production cost of the pilot valve.

In order to achieve the foregoing objects, according to a first aspect of the present invention, there is provided a pilot valve comprising a valve body, four spools slidably disposed within the valve body so as to interrupt/establish communication between inlet and outlet ports formed in the valve body, four pistons slidably mounted within the valve body so as to slidably move these spools, a disk mounted to the lower portion of a lever mounting shaft and having a lower surface in contact with a top of each of the pistons, either the disk or the pistons being moved to cause the spools to establish communication between the inlet port and the outlet port when a lever is pivoted in forward, rearward, leftward and rightward directions, wherein the disk includes a spherical recess formed centrally in its lower portion and having a downwardly directed opening, wherein the valve body includes a spherical projection formed centrally at its upper portion and extending upwards, the spherical projection being pivotably received in the spherical recess to provide a ball joint, and wherein the lever mounting shaft has at its one end rotation resistance means cooperative with the spherical projection to prevent the lever mounting shaft from rotating about its own axis when the lever is operated.

Also, in order to achieve the foregoing objects, according to a second aspect of the present invention, there is provided a pilot valve including a valve body, four spools slidably disposed within the valve body so as to interrupt/ establish communication between inlet and outlet ports formed in the valve body, four pistons slidably mounted within the valve body so as to slidably move these spools, a disk mounted to the lower portion of a lever mounting shaft and having a lower surface in contact with a top of each of the pistons, either the disk or the pistons being moved to cause the spools to establish communication between the inlet port and the outlet port when a lever is pivoted in forward, rearward, leftward and rightward directions, the pilot valve comprising retainers situated at base ends of the pistons to hold the pistons in a neutral positions whereby the top of each of the pistons is in contact with the disk, primary springs disposed between the retainers and the valve body, and stopper means arranged suitably on the outer periphery of the disk and corresponding portions of the valve body for limiting stork of the lever.

With the present invention, the disk is pivotably mounted to the valve body through the ball joint. This simplifies the structure of and reduces the number of parts of a mount by which the disk is mounted, thereby reducing the projection cost of the mount and bringing the mount and thus, the overall pilot valve into a compact arrangement.

Also, the disk is so structured as to inhibit the lever mounting shaft from rotating about its own axis, and erroneous operation is thus prevented.

Moreover, the stopper receiver of the disk are bought into contact with the stoppers of the valve body during operation of the lever so as to limit stroke of the lever. This prevents application of heavy loads to the pistons and the retainers. Thus, the pistons and retainers can be made smaller and need not be made of expensive materials. This results in a decrease in the size and the production cost of the overall pilot valve.

The above and other objects, aspects and advantages of the present invention will become apparent to those skilled in the art upon making the reference to the following description and the accompanying drawings in which preferred embodiments incorporating the principles of the present invention is shown by way of example.

DETAILED DESCRIPTION OF THE PREFERRED EMBODIMENTS

Several preferred embodiments of the present invention will now be described with reference to the accompanying drawings.

Figure 2:
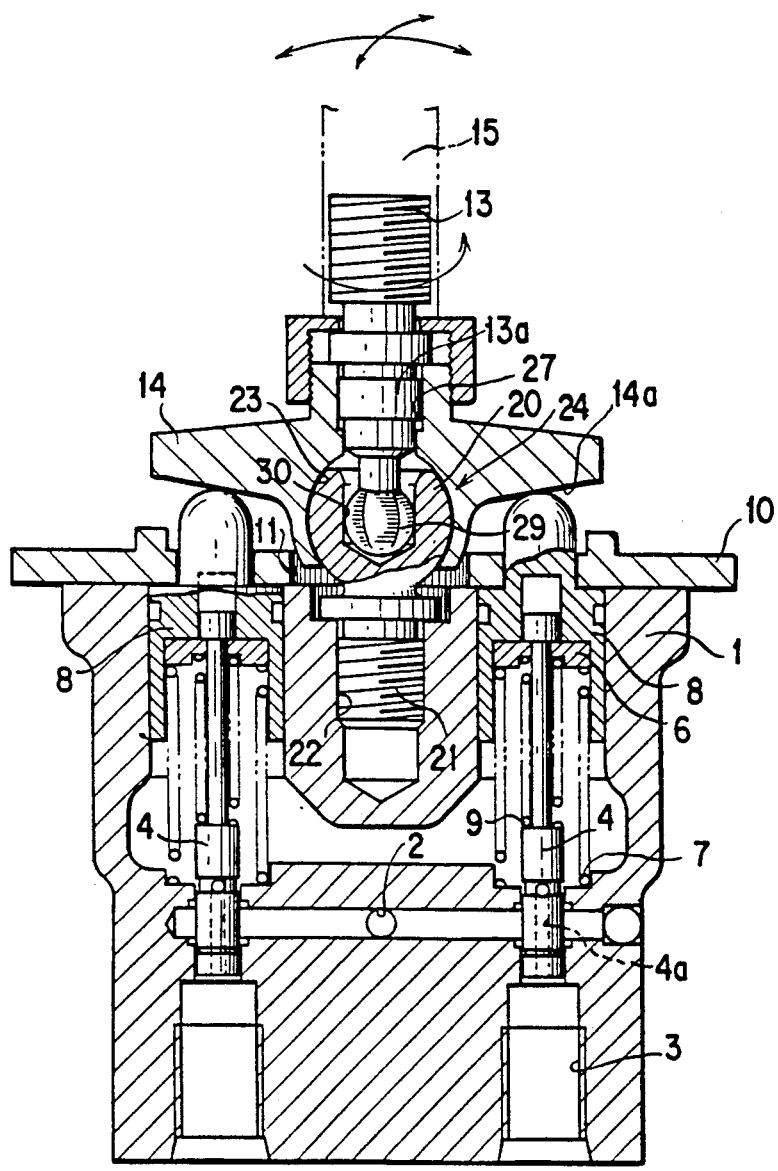
FIG. 2 is a schematic sectional view of a pilot valve according to a first embodiment of the present invention.

With reference first to FIG. 2 wherein a first embodiment is illustrated, the valve body 1 has threaded bore 22 in its upper portion. A screw rod 21 has a spherical projection 20 for threaded engagement with the threaded bore 22 of the valve body 1. The disk 14 has a spherical recess 23 in which the spherical projection 20 is pivotally fit to form a ball joint 24. The disk 14 has a lower surface 14a in contact with the upper portion of each piston 8.

The lever mounting shaft 13 has a threaded portion 13a for threaded engagement with a threaded bore 27 of the disk 14. The lever mounting shaft 13 has a rotation resistance member 29 at its one end. The spherical projection 20 has a rotation resistance recess 30 in which the rotation resistance member 29 is fit.

Figure 3:
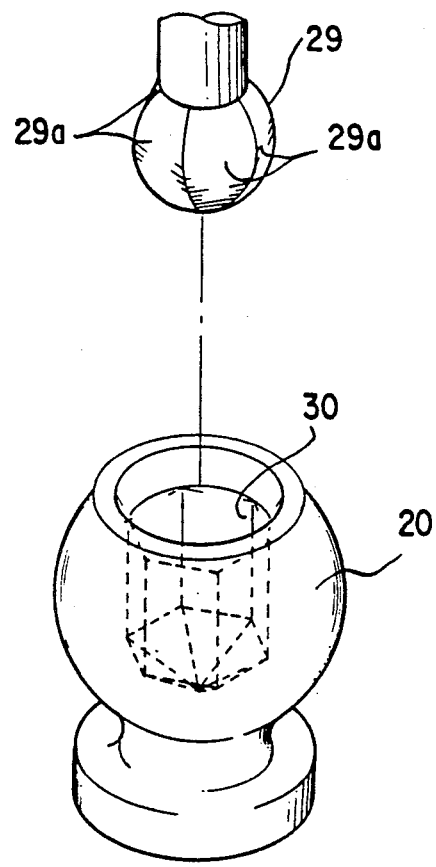
FIG. 3 is an exploded view, in perspective, of the embodiment shown in FIG. 2, showing the manner in which a lever mounting shaft and a valve body are jointed together.

As shown in FIG. 3, the rotation resistance member 29 has six sides 29a, each being arcuate in a vertical direction and flat in a lateral direction. The rotation resistance recess 30 has a hexagonal transverse section. The rotation resistance member 29 is pivotable in forward, backward, leftward and rightward directions, but nonrotatable about a vertical axis.

The rotation resistance member basically has a hexagonal structure, but may have any other polyhedral structure.

When the lever mounting shaft 13 is pivoted in forward, backward, leftward and rightward directions, the disk 14 is correspondingly pivoted in forward, backward, leftward and rightward directions around the spherical projection 20 so as to press down either one of the pistons or the two pistons 8. This allows either one of the spools or two spools 4 to establish communication.

The rotation resistance member 29 and the rotation resistance recess 30 cooperate to prevent the lever mounting shaft 13 from rotating. Thus, the lever mounting shaft 13 will not be erroneously operated.

Figure 1:
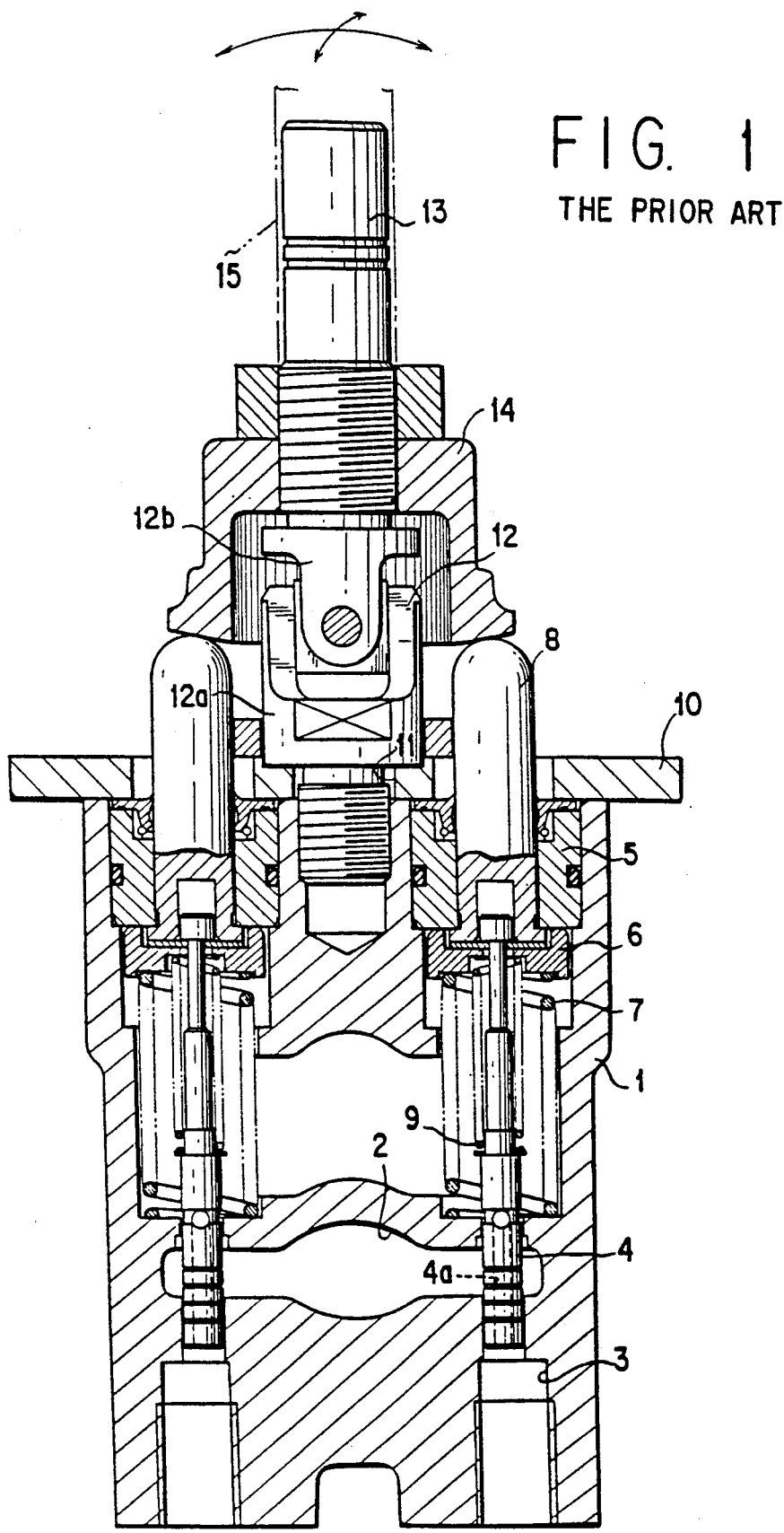
FIG. 1 is a schematic sectional view of a conventional pilot valve.

Other like components of the pilot valve, designated by like reference numerals, function in an identical manner to those of the prior art pilot valve shown in FIG. 1 and will not be discussed. This also applied to the following embodiments.

Figure 4:
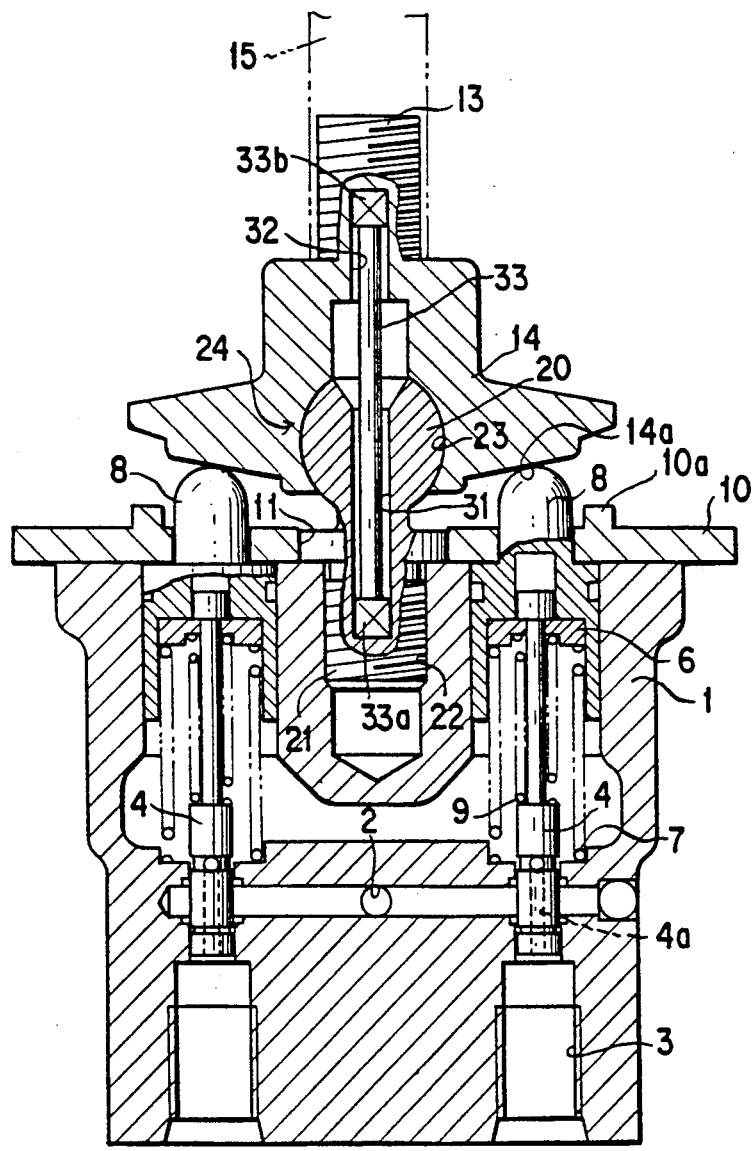
FIG. 4 is a schematic sectional view of a pilot valve according to a second embodiment of the present invention.

With reference next to FIG. 4 wherein a second embodiment of the present invention is illustrated, the spherical projection 20 has a central, vertical bore 31. The disk 14 has a central, vertical bore 32. A spring element 33 is inserted into the vertical bore 32 and the vertical bore 31. The spring element 33 has a lower rectangular column 33a nonrotatably fit in its lower portion, and an upper rectangular column 33b nonrotatably fit in its upper portion. Thus, the spring element 33 prevents the disk 14 from rotating relative to the spherical projection 20 about the lever mounting shaft 13.

By this arrangement, the disk 14 is always held in its neutral position by the spring element 33 when the lever is not operated.

Figure 5:
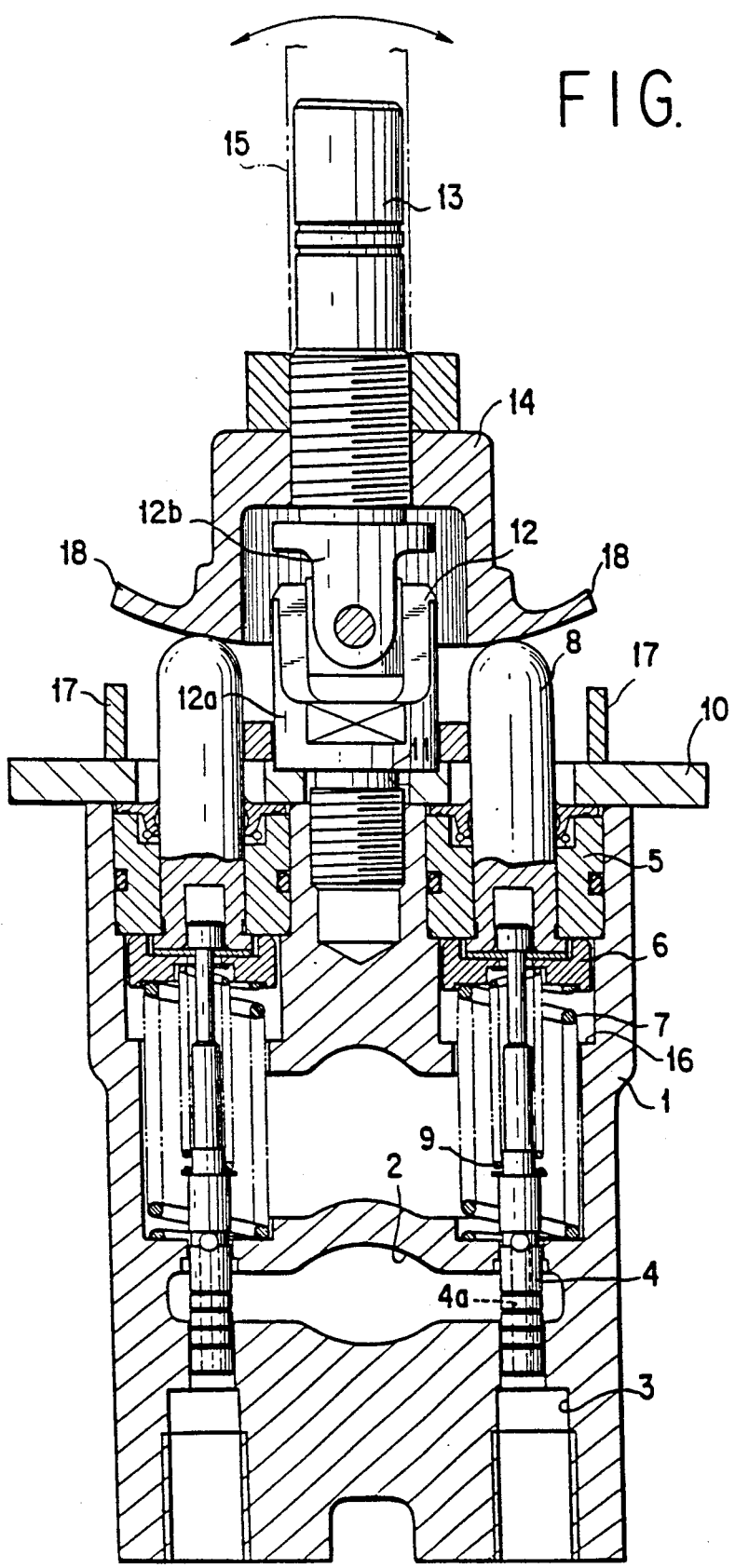
FIGS. 5 and 6 are schematic sectional views of pilot valves according to third and fourth embodiments of the present invention, respectively.

According to a third embodiment, as shown in FIG. 5, the mounting plate 10 includes stoppers 17 suitably arranged thereon. The disk 14 has an integral stopper receiver 18 on its outer periphery. The stopper receiver 18 is brought into contact with the stoppers 17 before the retainers 6 come into contact with the steps 16 so as to limit stroke of the lever 15.

In this way, no heavy load is exerted on the pistons 8 and the retainers 6. Thus, the pistons 8 and the retainers 6 can be brought into a compact arrangement, and made of cheap and low quality materials.

Figure 6:
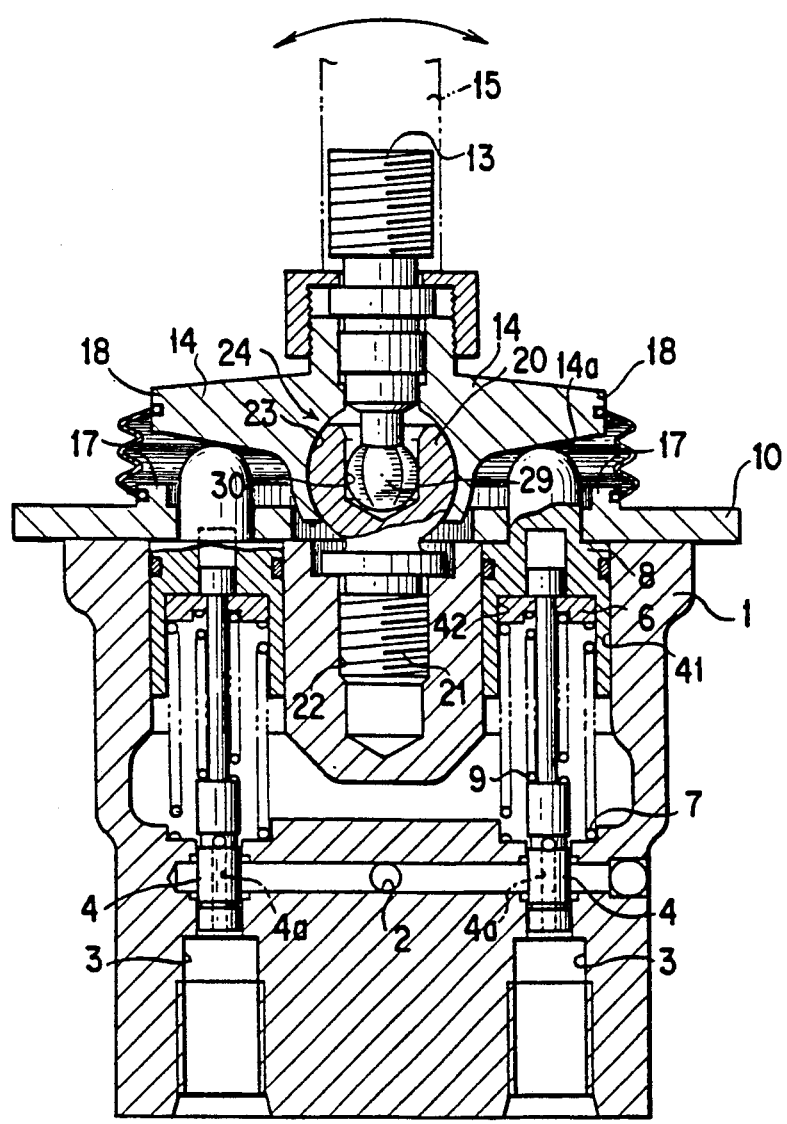

FIG. 6 shows a fourth embodiment wherein the screw rod 21 is threaded into the upper portion of the valve body 1, and the disk 14 is fit around the lower portion of the lever mounting shaft 13. The screw rod 21 is connected to the disk 14 through the ball joint 24 as in the first embodiment described in connection with FIG. 2. Of course, means are also provided to prevent the lever mounting shaft 13 from rotating about its own axis.

In order to avoid repeated explanation, any components designated by like reference numerals used in FIG. 2 will not be discussed.

The valve body 1 has piston holes 41 in which the pistons are slidably received. Each piston 8 has a blind bore 42 in which the retainer 6 is positioned. The piston 8 is in contact with the lower surface 14a of the disk 14.

With a combination of the mechanism for limiting stroke of the lever 15 and the ball joint for preventing rotation of the lever mounting shaft, the pilot valve can be brought into a compact arrangement.

What is claimed is:

1. A pilot valve comprising a valve body, four spools slidably disposed within said valve body so as to interrupt/establish communication between an inlet port and four outlet ports formed at portions in said valve body which correspond to said four spools, respectively, four pistons slidably mounted within said valve body so as to slidably move these spools, a disk mounted to the lower portion of a lever mounting shaft and having a lower surface in contact with a top of each of said pistons, said disk and any one of said pistons being moved to cause one of said spools which corresponds to the piston moved to establish communication between the inlet port and andy one of the outlet ports when a lever is pivoted in any one of forward, rearward, leftward and rightward directions, wherein said disk includes a spherical recess formed centrally in its lower portion and having a downwardly direct opening, wherein said valve body includes a spherical projection formed centrally at its upper portion and extending upwards, said spherical projection being pivotably received in said spherical recess to provide a ball joint, and wherein said lever mounting shaft has at its one end rotation resistance means cooperative with the spherical projection to prevent said lever mounting shaft from rotating about its own axis when the lever is operated.

2. A pilot valve according to claim 1, wherein said rotation resistance means includes a rotation resistance member formed at one end of said lever mounting shaft, and a rotation resistance recess formed centrally in said spherical projection and having an upwardly directed opening, whereby said rotation resistance member is closely fit in said rotation resistance recess.

3. A pilot valve according to claim 2, wherein said rotation resistance member has six sides and is centrally enlarged to make each of said sides arcuate in an axial direction and flat in a lateral direction, and wherein said rotation resistance recess has a hexagonal transverse section.

4. A pilot valve according to claim 1, further including retainers situated at base ends of said pistons to hold said pistons in a neutral position whereby the top of each of said pistons is in contact with said disk, primary springs disposed between said retainers and said valve body, and stopper means arranged suitably on the outer periphery of said disk and corresponding portions of said valve body for limiting stroke of said lever.

5. A pilot valve according to claim 4, wherein said stopper means includes a stopper receiver formed on the outer periphery of said disk, and stoppers formed on the upper surface of a mounting plate mounted on the valve body.

* * * * *